United States Patent [19]

Wasylyk

[11] Patent Number: 4,735,645
[45] Date of Patent: Apr. 5, 1988

[54] METHOD AND APPARATUS FOR TEMPERING GLASSWARE

[75] Inventor: John S. Wasylyk, Butler, Pa.

[73] Assignee: American Glass Research, Inc., Butler, Pa.

[21] Appl. No.: 37,419

[22] Filed: Apr. 13, 1987

[51] Int. Cl.$^4$ .............................................. C03B 27/06
[52] U.S. Cl. ........................................ 65/114; 65/115; 65/348; 65/351
[58] Field of Search .................. 65/114, 115, 348, 351

[56] References Cited

U.S. PATENT DOCUMENTS

| | | | |
|---|---|---|---|
| 2,375,944 | 5/1945 | Quentin | 65/351 X |
| 2,386,455 | 10/1945 | Green | 65/348 X |
| 2,519,059 | 8/1950 | MacConnell, Jr. | 65/114 |
| 2,563,130 | 8/1951 | Mylchreest | 65/348 |

*Primary Examiner*—Arthur Kellogg
*Attorney, Agent, or Firm*—Buchanan Ingersoll Professional Corporation

[57] ABSTRACT

Ducts are provided to direct cooling gas onto the outer and interior surfaces of a rotating article of glassware that is heated to a uniform temperature above the strain point of the particular glass composition from which the glassware is formed in order to temper the glassware by producing beneficial residual compressive stresses on the surfaces. The ducts have gas emitting nozzles that shape the cooling gas streams to conform to the shape of the glassware surfaces. The ducts and nozzles are so positioned that the cooling gas impinges upon the glassware surfaces tangentially and in a direction opposite to the direction of rotation of the surfaces to increase the effective velocity of the gas and to promote laminar flow of the cooling gas over the surfaces and thereby enhance cooling. The duct and nozzle that direct gas against the interior surface have a helical baffle plate associated therewith so that the cooling gas is scooped out of the glassware by the baffle plate after it contacts the interior surface and is heated thereby. The cooling gas is preferably compressed air.

20 Claims, 1 Drawing Sheet

METHOD AND APPARATUS FOR TEMPERING GLASSWARE

BACKGROUND OF THE INVENTION

1. Field of the Invention.

This invention relates to a method and apparatus for tempering glassware to produce residual compressive stresses on the glassware surfaces in order to increase the resistance of the glassware to mechanical and thermal stresses to which it is subjected during use.

2. Description of the Prior Art.

Glassware made of soda-lime-silica or other glass compositions may be tempered to produce residual compressive stresses on the glassware surfaces to increase the resistance of the glassware to mechanical and thermal stresses to which it may be subjected during use. The beneficial residual compressive stresses result from the establishment of significant temperature differentials through the thickness of the sections of the glassware after the glassware has been heated to a uniform temperature for a sufficiently long period of time. The glassware must be uniformly heated above the strain point of the particular glass composition used to form the item. The magnitudes of the temperature differentials established during the tempering process determine the magnitudes of the residual compressive stresses which increase the performance of the glassware.

The temperature differentials utilized to produce the tempering are typically established by directing high velocity streams of cooler air onto the uniformly heated glassware surfaces. An example of this method of tempering may be found in U.S. Pat. No. 3,155,481. U.S. Pat. Nos. 2,390,910 and 3,608,766 are also directed to tempering glassware, as are United Kingdom Pat. No. 810,174, French Pat. No. 833,559, and Italian Pat. No. 359,686.

While methods and apparatus for tempering glassware are known, none of the methods or apparatus provide an efficient procedure for directing cooling gas against a rotating glass article so that the surface of the glass article is efficiently subjected to residual compressive stresses that strengthen the glassware. Therefore, there is a need for a method and apparatus which provides for the efficient cooling of the surface of heated glassware in order to temper it effectively.

SUMMARY OF THE INVENTION

In accordance with the present invention, there is provided a method of tempering a rotating glass article that is at a uniform temperature above the strain point of the glass. A stream of cooling gas under pressure is directed tangentially against the surface of the rotating glass article. The stream of cooling gas is directed so that it is moving in a direction opposite to the direction of rotation of the surface of the rotating glass article as the gas contacts the surface. The stream of cooling gas is directed against the surface of the rotating glass article until compressive stresses are produced on the surface. The tangential velocity of the rotating object adds to the velocity of the impinging cooling gas stream, effectively increasing the rate of convective thermal energy removal, thereby adding to the efficiency of the tempering process.

Further, in accordance with the present invention, there is provided a method of tempering a rotating glass article that is at a uniform temperature above the strain point of the glass by simultaneously inducing compressive stresses on the inner and outer surfaces of the article. A first stream of cooling gas is directed under pressure tangentially against the outer surface of the rotating glass article so that it is moving in a direction opposite to the direction of rotation of the outer surface as the gas contacts the outer surface. A second stream of cooling gas under pressure is directed tangentially against the interior surface of the rotating glass article so that the second stream is also moving in a direction opposite to the direction of rotation of the interior surface of the article as the gas contacts the interior surface. A baffle plate is provided to assist in the removal of the gas from the interior of the rotating glass article after the gas has contacted the interior surface.

Additionally, in accordance with the present invention, apparatus is provided for tempering a rotating glass article that is at a uniform temperature above the strain point of the glass. The apparatus comprises a duct having an outlet end that conducts a stream of cooling gas under pressure and a support means fixed to the duct and to the apparatus carrying the rotating glass article to maintain the duct outlet end in a fixed position relative to the rotating glass article. The duct is positioned relative to the glass article so that cooling gas leaving the duct outlet end contacts the surface of the rotating glass article tangentially while moving in a direction opposite to the direction of rotation of the surface of the glass article.

Accordingly, the principal object of the present invention is to provide a method and apparatus for efficiently cooling the surfaces of glassware to provide effective tempering of the glassware.

Another object of the present invention is to provide a method of directing cooling gas against the rotating surface of glassware in the most effective manner for tempering the glassware.

Another object of the present invention is to provide apparatus for directing cooling gas against the rotating surface of glassware to effectively temper the glassware.

These and other objects of the present invention will be more completely disclosed and described in the following specification, the accompanying drawings and the appended claims.

DESCRIPTION OF THE PREFERRED EMBODIMENT

Figure 1:
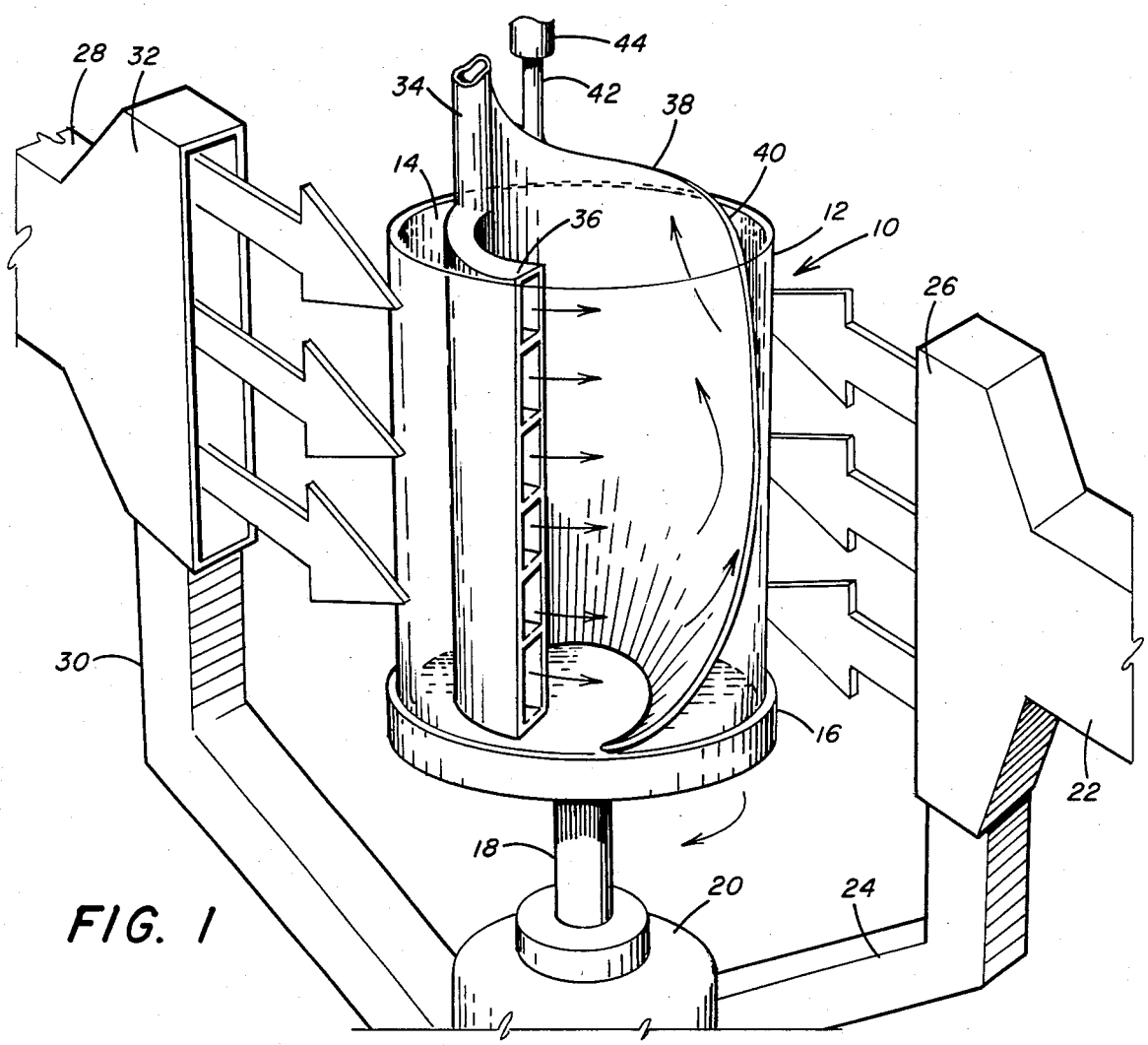
FIG. 1 is a perspective view of the apparatus of the present invention being utilized to temper a cylindrical glass container.

Referring to the drawings, there is shown a glassware article generally designated by the numeral 10 having an outer surface 12 and an interior surface 14. The glassware article 10 is a container having a generally cylindrical configuration.

The glassware article 10 is clamped to a turntable 16 by means of clamps (not shown) during a portion of the manufacturing process. A shaft 18 is fixed to turntable 16 and rotates it in conventional fashion. A fixed housing 20 has shaft 18 journaled therein. The housing 20 is part of a conveyor line which moves the glass article 10 through various stages of manufacture. The housing 20, shaft 18, and turntable 16 are conventional in construction and are all part of a conventional glassware manufacturing line known in the art.

As part of the present invention, a duct 22 is provided to conduct cooling gas to the surface of article 10. The duct 22 has fashioned on the end thereof a gas emitting nozzle 26. The gas emitting nozzle 26 and the duct 22 are fixed relative to housing 20 by means of a support 24 that holds the duct 22 and nozzle 26 in position. The nozzle 26 is elongated in shape so as to conform the gas stream leaving the nozzle to the shape of the surface of article 10 which is, in this case, cylindrical.

Figure 2:
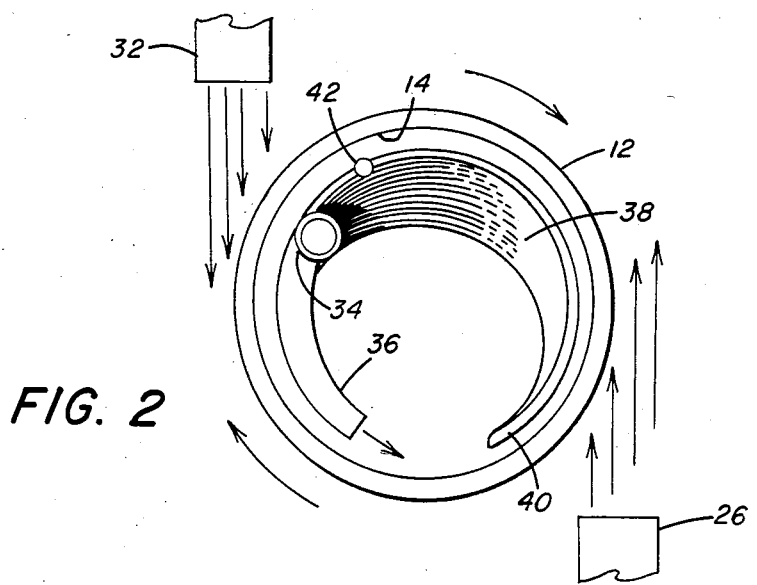
FIG. 2 is a top plan view of the apparatus shown in FIG. 1.

As best seen in FIG. 2, the nozzle 26 directs the gas stream (indicated by arrows) so that it impinges tangentially upon the exterior surface 12 of article 10. As viewed in FIG. 2, the article 10 is rotated in a clockwise direction (indicated by arrows) so that the direction of rotation of the surface 12 is opposite to the direction of flow of the gas being emitted from nozzle 26.

In FIG. 1, a second duct 28 is provided with a nozzle 32. Support 30 supports the duct 28 and nozzle 32 relative to the fixed housing 20. The duct 28 and nozzle 32 are identical to duct 22 and nozzle 26, respectively, which have already been described. As seen in FIG. 2, gas being emitted from nozzle 32 impinges tangentially upon the exterior surface 12 of article 10 in a direction opposite to the direction of rotation of surface 12. As shown in FIG. 1, another duct 34 is provided to conduct cooling gas to the interior of article 10. The duct 34 has a gas emitting nozzle 36 which is elongated and conforms generally to the shape of the interior surface 14 of article 10. Also fixed to duct 34 and nozzle 36 is a generally helical baffle plate 38 which extends into the interior of article 10 and is positioned so that the leading edge 40 of baffle plate 38 extends into close proximity to the interior surface 14 of article 10 such that the distance between the surface 14 and the leading edge 40 is one-eighth of an inch or less. A support 42 is fixed to baffle plate 38 and supports the baffle plate 38, the duct 34, and the nozzle 36 in position within the article 10. A sleeve 44 receives the support 42 so that support 42 can be raised and lowered relative to article 10 to withdraw the duct 34 and nozzle 36 out of the interior of article 10. The sleeve 44 is fixed by support means (not shown) to the housing 20.

The duct 34, nozzle 36, and baffle plate 38 are fixed and the rotating article 10 rotates about them. As seen in FIG. 2, gas being emitted from nozzle 36 impinges tangentially upon the interior surface 14 of article 10 thereby cooling the surface 14 and causing the gas to become heated from contact with the surface. The helical baffle plate 38, with its leading edge 40 in close proximity to surface 14, serves as a scoop to cause the heated cooling gas to be moved axially upward out of the article 10. As is also seen in FIG. 2, the gas being emitted by nozzle 36 is moving in a direction opposite to the direction of rotation of the interior surface 14 of article 10.

The cooling gas being conducted by ducts 22, 28, and 34 is preferably compressed air which is utilized to temper the glassware of article 10. It will be appreciated, however, that other types of gas can be utilized as the cooling gas, and in some instances, inert gas may be preferable to compressed air in practicing the present invention.

In operation, the turntable 16 with the article 10 clamped thereon is moved past a source of heat so that the glassware is uniformly heated to a temperature above the strain point of the particular glass composition. This process is conventional in glassware manufacturing lines. After the glassware article 10 is heated, the turntable 16 is moved further along by a conveyor means. The ducts 22, 28 and 34 are then positioned relative to article 10 and supported in place by supports 24, 30 and 42, respectively. Cooling gas is then emitted from the nozzles 26, 32 and 36 so that it strikes the surfaces of article 10 tangentially and in a direction opposite to the direction of rotation of the respective surfaces of article 10. The gas striking outer surface 12 is dissipated after contacting the heated surface and being heated thereby. The gas contacting the interior surface 14 is gathered by baffle plate 38 and moved axially out of the article 10 to a place where it is dissipated.

By providing cooling gas which impinges upon the surface of the glass article 10 tangentially to the surface and in a direction opposite to the direction of rotation of the surface of article 10 improved tempering results. Since the cooling gas is moving in a direction opposite to the direction of rotation of the surface of article 10, the effective velocity of the cooling gas is increased by the linear velocity of the surface of the rotating article 10. This increase in effective velocity increases the cooling effect of the cooling gas so that for a given velocity of cooling gas, increased cooling results from the direction of movement of the gas relative to the rotating article 10.

In prior art tempering methods and apparatus, heated glassware is typically passed through a series of separate cooling air jets which are directed both downward into the glassware and perpendicularly onto the outside surfaces of the glassware. Such conditions are not conducive to establishing high flow rates or velocities of the cooling gas over the glassware surface. Increasing cooling medium velocities in the prior art tempering methods will require larger and more expensive compressors which will, in turn, result in increased energy, capital and operating costs.

As seen in FIG. 2, the nozzles 26 and 32 are positioned so that the gas impinges the outer surface 12 of article 10 tangentially and in diametrically opposite positions on the surface. In this way, there is no interference of gas from the respective nozzles 26 and 32.

It will be appreciated that the foregoing description provides for a rotating turntable 16 carrying the article 10 with fixed ducts 22, 28 and 34. In some instances it may be desirable to have the article 10 remain stationary and to have the ducts 22, 24, and 34 rotate about the article 10 which can be achieved by modification of the duct structure. With such an arrangement, the duct structure will rotate in a direction so that the velocity of the duct itself will be added to the velocity of the cooling gas that is limited therefrom so that principles of the present invention will be fulfilled. In like manner, it may even be desirable to have the glass article 10 rotate in one direction and have the ducts 22, 24, and 34 rotate in the opposite direction which would further increase the relative velocity of the gas impinging on the surface of article 10.

According to the provisions of the patent statutes, I have explained the principle, preferred construction and mode of operation of my invention and have illustrated and described what I now consider to represent its best embodiment. However, it should be understood that, within the scope of the appended claims, the invention may be practiced otherwise than as specifically illustrated and described.

I claim:

1. A method of tempering a glass article that is at a uniform temperature above the strain point of the glass comprising the steps of,
   directing a stream of cooling gas under pressure from a duct tangentially against the surface of said glass article, said glass article and said duct having rotating motion relative to each other,
   positioning said stream of cooling gas so that said stream is moving in a direction such that the velocity of said cooling gas is added to the direction of rotation of the surface of said glass article relative to said duct so that said gas contacts said surface at a higher velocity than if said glass article and said duct did not rotate relative to each other, and
   continuing to direct said stream of cooling gas against said glass article surface until compressive stresses are produced on said surface.

2. A method as set forth in claim 1 which includes,
   directing said cooling gas against said glass article surface through said duct, and
   shaping said stream of cooling gas from said duct to conform to said surface.

3. A method as set forth in claim 1 wherein,
   said cooling gas is compressed air.

4. A method as set forth in claim 1 which includes,
   directing a second stream of cooling gas under pressure from a second duct fixed relative to said first duct tangentially against the surface of said glass article at a point on said glass article surface diametrically opposed to said stream of cooling gas.

5. A method as set forth in claim 4 which includes
   positioning said stream of cooling gas and said second stream of cooling gas so that the velocity of said streams are each increased by the rotational difference between said glass article and said ducts as said gas contacts said surface.

6. A method as set forth in claim 4 which includes,
   directing said stream of cooling gas and said second stream of cooling gas against said glass article surface through said duct and said second duct, and
   shaping said streams from said ducts to conform to said surface.

7. A method as set forth in claim 4 wherein,
   said cooling gas is compressed air 8. A method of tempering a rotating glass article that is at a uniform temperature above the strain point of the glass by simultaneously inducing compressive stresses on the inner and outer surfaces of said article comprising the steps of,
   directing a first stream of cooling gas under pressure tangentially against the outer surface of said rotating glass article so that said first stream is moving in a direction opposite to the direction of rotation of said outer surface as said gas contacts said outer surface,
   directing a second stream of cooling gas under pressure tangentially against the interior surface of said rotating glass article so that said second stream is moving in a direction opposite to the direction of rotation of said interior surface as said gas contacts said interior surface, and
   removing said second stream from the interior of said rotating glass article after said gas has contacted said interior surface.

9. A method as set forth in claim 8 which includes,
   directing said first stream of cooling gas against said glass article surface through a duct having a gas emitting nozzle that shapes said stream to conform to said surface.

10. A method as set forth in claim 8 which includes,
    directing a third stream of cooling gas under pressure tangentially against the outer surface of said rotating glass article at a point on said glass article surface diametrically opposed to said first stream so that said third stream is moving in a direction opposite to the direction of rotation of said outer surface as said gas contacts said outer surface.

11. A method as set forth in claim 8 which includes,
    removing said second stream from the interior of said rotating article by baffle means, and
    maintaining said baffle means fixed as said glass article rotates around it.

12. Apparatus for tempering a rotating glass article that is at a uniform temperature above the strain point of the glass comprising,
    means for carrying said rotating glass article,
    a duct having an outlet end for conducting a stream of cooling gas under pressure,
    support means fixed to said duct and to said means for carrying said rotating glass article for maintaining said duct outlet end in a fixed position relative to said rotating glass article, and
    said duct being positioned relative to said glass article so that said cooling gas leaving said duct outlet end contacts the surface of said rotating glass article tangentially while moving in a direction opposite to the direction of rotation of the surface of said rotating glass article.

13. Apparatus as set forth in claim 12 wherein,
    said duct outlet end is a gas emitting nozzle that shapes said stream as it leaves said duct to conform to said glass article surface.

14. Apparatus as set forth in claim 12 which includes,
    a second duct having an outlet end for conducting a second stream of cooling gas under pressure,
    a second support means fixed to said second duct and to said means for carrying said rotating glass article whereby said second support means maintains said second duct outlet end in a fixed position relative to the interior surface of said rotating glass article, and
    said second duct being positioned relative to said glass article so that said cooling gas leaving said second duct outlet end contacts the interior surface of said rotating glass article tangentially while moving in a direction opposite to the direction of rotation of the interior surface of said rotating glass article.

15. Apparatus as set forth in claim 14 which includes,
    baffle means for facilitating removal of cooling gas from the interior of said rotating glass article after said gas contacts said glass article interior surface and is warmed thereby.

16. Apparatus as set forth in claim 15 in which
    said baffle means has a helical surface with the leading edge of said helical surface being positioned in close proximity to said rotating glass article interior wall.

17. Apparatus as set forth in claim 15 in which,
    said second support means is adjustable to remove said second duct and said baffle means from the interior of said rotating glass article.

18. Apparatus as set forth in claim 14 in which,
    said duct outlet end and said second duct outlet end are each gas emitting nozzles that shape said gas streams leaving said nozzles to conform to the respective outer and interior surfaces of said rotating glass article.

19. Apparatus as set forth in claim 14 in which, said cooling gas is compressed air.

20. Apparatus as set forth in claim 14 which includes a third duct having an outlet end for conducting a third stream of cooling gas under pressure, third support means fixed to said third duct and to said means for carrying said rotating glass article for maintaining said third duct outlet end in a fixed position relative to said rotating glass article at a point diametrically opposed on said article outer surface from the position of the original duct outlet end, and said third duct being positioned relative to said glass article so that said cooling gas leaving said third duct outlet end contacts the outer surface of said rotating glass article tangentially while moving in a direction opposite to the direction of rotation of the outer surface of said rotating glass article.

* * * * *